United States Patent [19]
Chen

[11] Patent Number: 5,345,562
[45] Date of Patent: Sep. 6, 1994

[54] DATA BUS ARBITRATION FOR SPLIT TRANSACTION COMPUTER BUS

[75] Inventor: Chang-Lung Chen, Hsing-Chu, Taiwan

[73] Assignee: Industrial Technology Research Institute, Hsinchu

[21] Appl. No.: 836,060

[22] Filed: Feb. 12, 1992

[51] Int. Cl.⁵ ............................................. G06F 13/00
[52] U.S. Cl. ................................. 395/275; 395/200
[58] Field of Search .................. 395/200, 275, 325

[56] References Cited
U.S. PATENT DOCUMENTS
5,191,649  3/1993  Cadambi et al. ................... 395/200

Primary Examiner—Robert L. Richardson
Attorney, Agent, or Firm—Meltzer, Lippe, Goldstein, Wolf, Schlissel & Sazer

[57] ABSTRACT

An arbitration method is disclosed which insured that both write data and ordered read responses achieve fair access to a data bus in a computer system which comprises demultiplexd commands and data buses and a plurality of processors.

4 Claims, 9 Drawing Sheets

DATA BUS ARBITRATION FOR SPLIT TRANSACTION COMPUTER BUS

FIELD OF THE INVENTION

This invention relates to data bus arbitration in a multiple processor computer system comprising a plurality of processors and demultiplexed address/command and data buses. The present invention insures that both ordered responses to read commands and write data achieve fair access to the data bus.

BACKGROUND OF THE INVENTION

A computer system comprising a plurality of processors and a bus system is illustrated in FIG. 1. The computer system 10 comprises a plurality of processors 12 and 14. The processors are divided into two groups, the master processors 12 and the slave processors 14. In general, the master processors 12 communicate to the slave processors 14 particular commands to be carried out. Data is exchanged between the masters and slaves in response to the commands. For example, the master processors 12 generate write commands for writing data into particular slave processors 14. The master processors 12 also generate read commands for reading data from particular slave processors 14. As shown in FIG. 1, a master processor 12 may be a CPU or an I/O controller. A slave processor 14 is typically a memory such as a main memory or a disk memory.

The processors 12 and 14 are interconnected by a bus system 16. The bus system 16 includes an address/command bus 18, a data bus 20, and an arbitration/control bus 22. Illustratively, the address/command bus 18 is shown as comprising separate address and command buses 18a and 18b. Each of the buses 18, 20, 22 may be viewed as comprising a set of wires. The address/command bus 18 is used to transmit commands generated by a master processor 12 to a particular slave processor 14 indicated by an address associated with the command. The data bus 20 is used to exchange data among the master and slave processors in response to commands. The arbitration/control bus 20 is used for handshaking, negotiation, etc. between masters and slaves. In a preferred embodiment, the present invention is applicable to a demultiplexed bus system. In a demultiplexed bus system, the address/command bus 18, the data bus 20, and the arbitration/control bus 22 are physically separate.

As can be seen from FIG. 1, the address/command bus 18 and the data bus 20 are common components which many processors want to use. Thus, an arbitration mechanism is utilized to control access to the buses 18,20 at any given time. Illustratively, the arbitration is carried out by the processors in a distributed manner using the arbitration bus 22. As is described in greater detail below, because the address/command bus and the data bus are physically separate, separate arbitrations are utilized to determine specific processors which gain access to the address/command bus and to the data bus.

The write and read transactions which are carried out by the computer system 10 are now considered in greater detail. A write transaction may be viewed as comprising a write address and command transmitted via the address/command bus and write data transmitted via the data bus. A read transaction comprises a read address and command transmitted via the address/command bus and response data transmitted via the data bus. FIG. 2 shows the timing of some write and read commands on the address/command bus and the corresponding data on the data bus. As can be seen from FIG. 2, in the execution of a write transaction, the write command utilizes the address/command bus and the write data utilizes the data bus almost simultaneously. In contrast, in the execution of a read transaction, there is a delay between the issuing of the read command on the address/command bus and the issuing of the corresponding response data on the data bus. The delay arises because of the time it takes to access a memory to obtain the response data requested by the read command. This kind of transaction is known as a split read transaction. Note, however, that the read responses are maintained in the same order as the read commands, i.e., read command B follows read command A on the address/command bus and read response B follows read response A on the data bus. Thus, the split read responses follow a first-request-first-response order. As is described in greater detail below, the present invention provides an arbitration protocol which enables both write data and split ordered read response data to utilize the data bus in a fair and efficient manner.

FIG. 3 is a Petri-Net like model 30 which illustrates the arbitration process for the computer system 10 of FIG. 1. It should be noted that there are two separate arbitrations, one arbitration for the address/command bus and one arbitration for the data bus. Although these arbitrations may actually be carried out in a distributed fashion at the processors 12,14 themselves through use of the arbitration/control bus 22, in FIG. 3, the address/command bus arbitration is represented by the arbitration machine 32 and the data bus arbitration is represented by the arbitration machine 34.

Requests 36 by different processors 12,14 for access to the address/command bus 18 enter the address/command bus arbitration machine 32. (For purposes of economy the address/command bus is referred to hereinafter as the command bus.) In the schematic diagram of FIG. 3, each of the requests 36 entering the command bus arbitration machine 32 tries to seize the command bus token 38. The command bus arbitration machine 32 will generate one winner at a time.

If the winner is a read transaction, processing is via path 40 and 41. The read command immediately uses the command bus for one or more cycles (e.g., one cycle) to transmit the read command to the memory 43. The command bus is then released as indicated by returning the command bus token via path 41. After a certain memory read latency (recall, read transactions are split transactions), the read response enters a first-request-first-response queue 45 and tries to get on the data bus. The purpose of the first-request-first-response queue 45 is to insure that read responses access the data bus in the same order that read commands access the command bus.

If the winning request at the command bus arbitration machine 32 is a write transaction, processing is via path 50. A winning write transaction does not release the command bus token until getting through the data bus arbitration machine 34. This is because the write transaction uses the command bus to transmit the write command almost simultaneously with using the data bus to transmit the write data (see FIG. 2). Thus, a write transaction holds the command bus token until the data bus is available for the corresponding write data. Accordingly, if write transactions which win the command bus arbitration have to wait a long time to access the data bus, the command bus will be correspondingly blocked from other activities leading to a degradation in command bus bandwidth.

The data bus arbitration machine 34 receives as input requests, requests from the queue 45 to transmit ordered read responses and requests via line 50 to the transmit write data. The data bus arbitration box outputs one winner at a time, which winner may be viewed as seizing a data bus token 52. If a write transaction wins the data bus arbitration, it issues the write command on the command bus and returns the command bus token 38 via path 54. The write data is then transferred via the data bus. This data transfer process is symbolized by 56. In addition, the data bus token 52 is returned. If the winner is a read response, the data bus transfer 56 is applied to the read response data and the data bus token 52 is returned.

The present invention is concerned with the data bus arbitration between the read responses and write data, schematically represented by the machine 34 in FIG. 3. In particular, the present invention is concerned with data bus arbitration between write data and read responses for a system wherein the command and data buses are demultiplexed, wherein read transactions are split transactions, and wherein a first-request-first-response order is maintained for the read responses. Prior art protocols for this situation show unfair favoritism to the read responses over the write data causing bottlenecks in the system.

The prior art data bus arbitration protocol is now considered in greater detail. The prior art data bus protocol is illustratively carried out by one or more finite-state machines located at the individual processors 12,14. (The data bus protocol machine 34 of FIG. 3 schematically represents all of these finite-state machines as well as the arbitration/control bus which connects them.) The prior art data bus protocol makes use of two control signals which are distributed to all processors via the arbitration/control bus. The control signals are DS*, which is asserted if the data bus is not currently available, and RspReqD*, which is asserted when an ordered read response is waiting for the data bus but has not yet achieved access to the data bus.

The protocol is as follows:
a) a processor which is performing a write transaction performs the following command steps:
   1) seize or takes control of the command bus (i.e. by winning the command bus arbitration),
   2) sample the signals DS* and RspReqD*,
   3) if both of these signals are in the dis-asserted state, issue the write command on the command bus, release the command bus, and issue the write data on the data bus,
   4) if one or both of these signals is asserted, hold the command bus, and when both are dis-asserted, issue the write command on the command bus, release the command bus, and issue the write data on the data bus; and
b) a processor which has a read response which is at the head of a first-request-first-response queue of read responses performs the following command steps:
   1) asserting RspReqD*
   2) sampling DS*
   3) when DS* is dis-asserted, issuing the response data on the data bus and dis-asserting RspReqD*.

This protocol favors the read responses over the write data because any read response which is at the head of queue and ready to issue data can assert RspReqD* which has the effect of blocking write data from access to the data bus. Thus, write data may have to wait for multiple read responses before gaining access to the data bus. This in turn has the effect of tying up the command bus, because a write transaction which gains access to the command bus, does not release the command bus until the corresponding write data gains access to the data bus. Thus, in addition to being unfair to write data, the prior art protocol causes a degradation in command bus bandwidth, and the blocked write can block further read and write requests from sending to memory system.

In view of the foregoing, it is an object of the invention to provide a data bus arbitration procedure which overcomes the problems discussed above.

SUMMARY OF THE INVENTION

The present invention is directed to a method for executing read transactions and write transactions in a computer system comprising a command bus, a data bus, and a plurality of processors in communication with the command bus and the data bus. The inventive method arbitrates between write data and split read responses to insure that both achieve fair access to the data bus.

In contrast to the prior art data bus arbitration protocol discussed above, the present invention relies on three control signals to perform data bus arbitration. The signal DS*, when asserted, indicates that the data bus is not currently available. The signal RspReqD*, when asserted, indicates that an ordered response to a read a command, which is at the head of a first-request-first-response queue of ordered read responses, is waiting for, but has not yet gained, access to the data bus. The signal WreqD*, when asserted, indicates that write data is waiting for, but has not yet gained, access to the data bus.

The protocol of the present invention is as follows:
a) if a processor desires to issue a read command then said processor performs read command steps comprising
   1) seizing or taking control of the command bus (e.g. by winning an arbitration);
   2) immediately issuing the read command on the command bus;
b) if a processor desires to perform a write transaction, then the processor performs write transaction steps comprising
   1) seizing the command bus (e.g. by winning an arbitration);
   2) sampling the signals DS, and RspReqD*;
   3) if both DS* and RspReqD* are not in an asserted state, issuing the write command on the command bus, releasing the command bus, and issuing the write data on the data bus;
   4) if one, but not both, of DS* and RspReqD* is in the asserted state, holding the command bus and asserting the WReqD*, and after DS* makes a transition from the asserted state to the dis-asserted state, dis-asserting WReqD*, issuing the write command on the command bus, releasing the command bus, and issuing the write data on the data bus;
   5) when both DS* and RspReqD* are in the asserted state, holding the command bus and asserting WReqD*, and after DS* makes two transitions from the asserted to the non-asserted state, dis-asserting WReqD*, issuing the write command on the command bus, releasing the command bus, and issuing the write data on the data bus;

c) if a processor desires to provide an ordered split response to a read command and the response is first in a first-request-first-response queue of ordered split read responses, then the processor performs response steps comprising 1) asserting RspReqD*;
2) sampling DS* and WReqD*;
3) if both DS* and WReqD* are in the dis-asserted state, dis-asserting RspReqD* and issuing the response data on the data bus;
4) if one of DS* and WReqD*, but not both, is in the asserted state, waiting until after DS* makes a transition from the asserted states to the dis-asserted state, then dis-asserting RspReqD*, and issuing the response data on the data bus;
5) if both of DS* and WReqD* are in the asserted state, waiting until after DS* makes two transitions from the asserted to the dis-asserted state, dis-asserting RspReqD* and issuing the response data on the data bus.

A primary difference between the present invention and the prior art is the use of the write request signal (WReqD*). The use of this signal insures that the data bus is allocated fairly between write data and ordered read response data. Without this signal, write data is blocked by consecutive read responses, thereby creating a system bottleneck. In addition, because write data has to be issued immediately after the write command, a write command has to hold the command bus until the data bus is available for the corresponding write data. Thus, without use of the write request signal, not only is write data blocked from the write bus by consecutive ordered read responses, but the command bus is blocked from other activities as well, so that there can be serious degradation of the command bus bandwidth.

The inventive protocol arbitrates between read responses and write data to achieve fair access to the data bus as follows. A processor having write data waiting for the data bus asserts a write request signal (WReqD*). The write request signal insures that at most a current transaction already on the data bus and one waiting read response use the data bus before the waiting write data. Similarly, a processor having a read response waiting for the data bus, which read response is at the head of a first-request-first-response queue of read responses, asserts a read response request signal (RspReqD*). The read response request signal insures that no more than a current transaction already on the data bus and the waiting write data of one write command use the data bus before the waiting read response.

DETAILED DESCRIPTION OF THE INVENTION

In the illustrative embodiment of the present invention discussed below, the following assumptions are made:

1. One cycle means one clock period;
2. The control/arbitration bus, command/address bus, and data bus, are synchronous buses, i.e., signals are driven onto a bus at the clock rising (or falling) edge and are received at the next rising (or falling) edge;
3. Illustratively, the bus is a TTL bus so that there should be one dead cycle between bus usages to avoid overlapped turning on and off;
4. There is a demultiplexed address/command bus and data bus;
5. Split read responses follow the first-request-first-response order;
6. The command bus arbitration requires two cycles to generate one winner, read and write transactions require one cycle to issue commands and addresses on the command/address bus.
7. A signal is asserted when it is logic low, dis-asserted when it is logic high;
8. The signal DS* is asserted when there is valid data for the data bus for the next clock cycle, so that the data bus is occupied;
9. Write data and response data may be one clock cycle in duration or more than one clock cycle.

Figure 1:
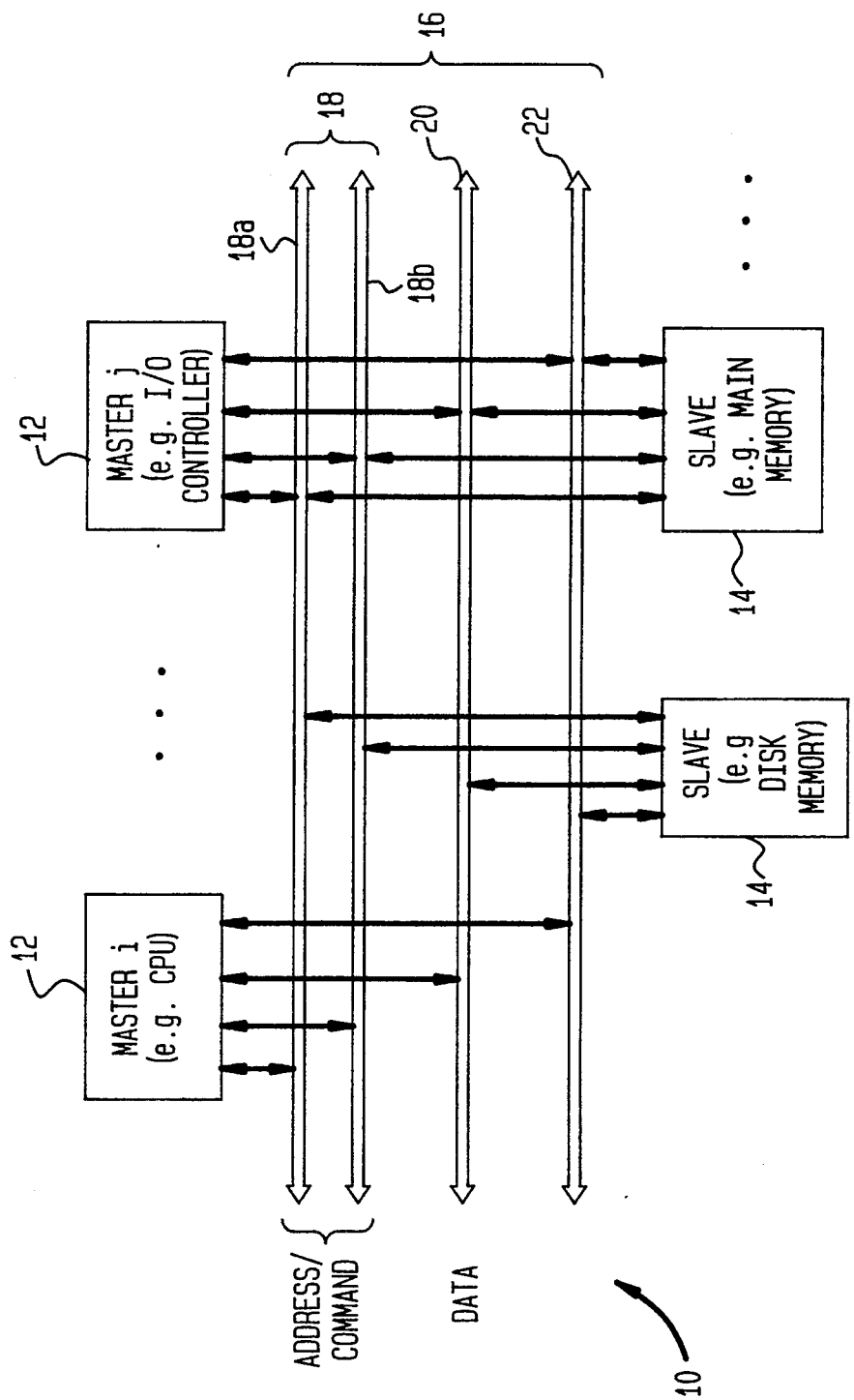
FIG. 1 illustrates a computer system comprising a demultiplexed bus system including a command bus and a data bus, and a plurality of processors.
Figure 2:
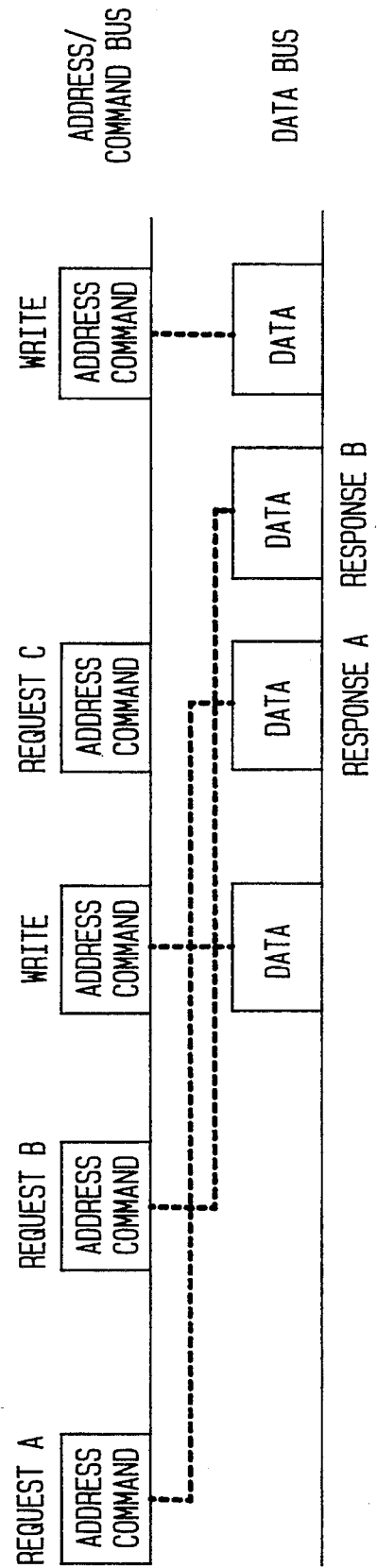
FIG. 2 illustrates write and split read transactions on the bus system of FIG. 1.
Figure 3:
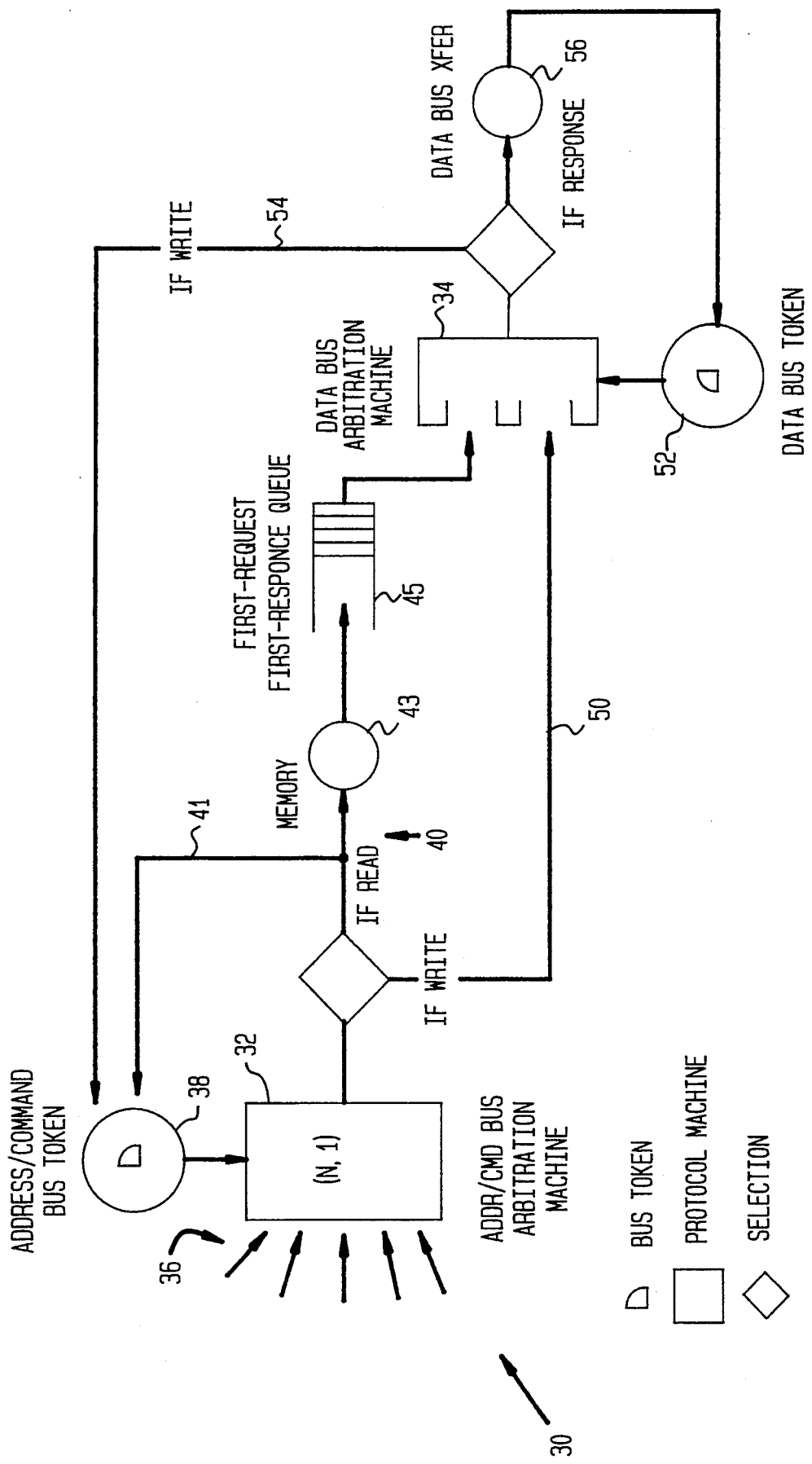
FIG. 3 schematically illustrates an arbitration process for gaining access to the command and data buses of FIG. 1.
Figure 4:
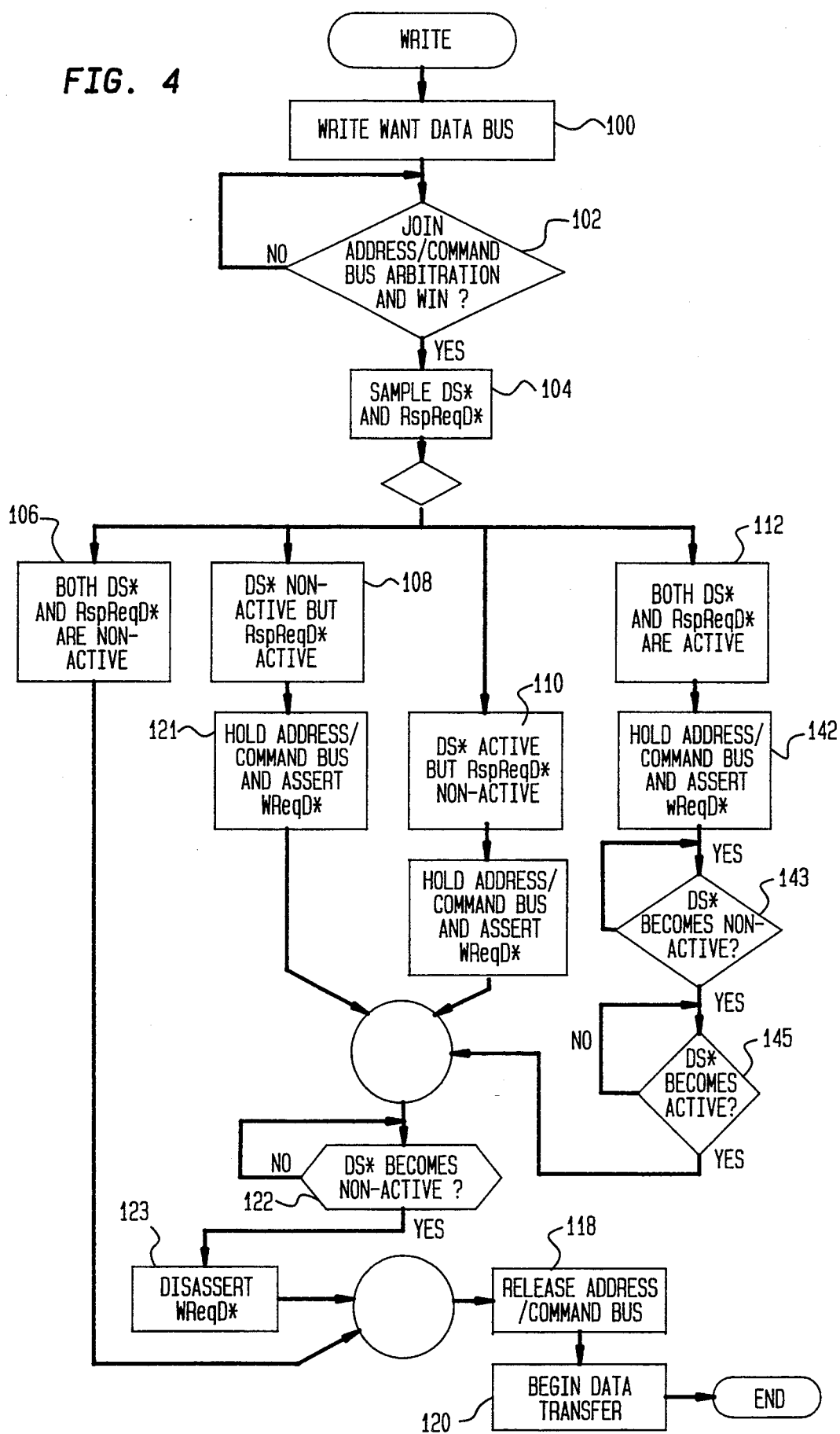
FIG. 4 illustrates a protocol which enables a write transaction to gain access to the data bus of FIG. 1, in accordance with the present invention.
Figure 8:
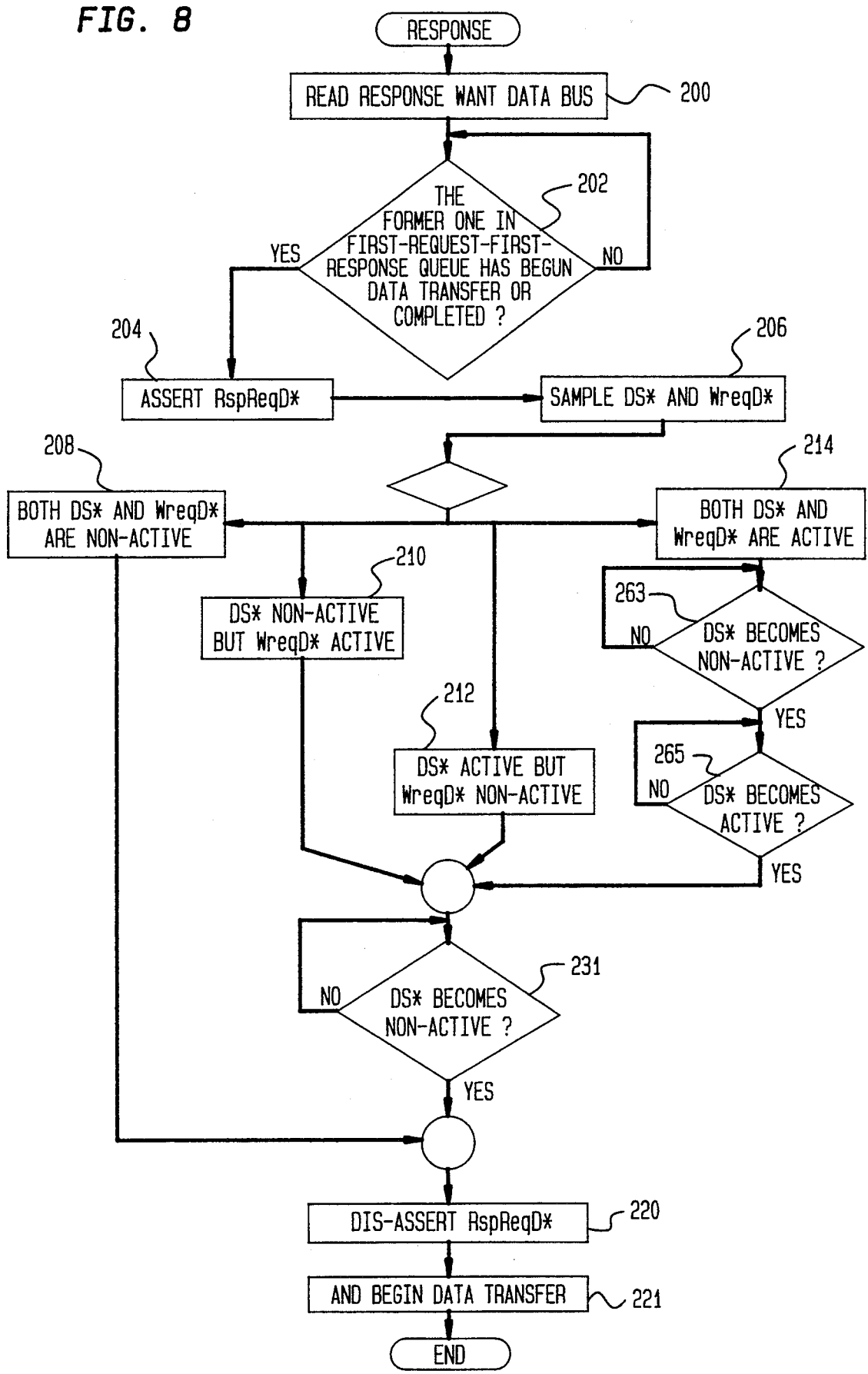
FIG. 8 illustrates a protocol which enables a read response to gain access to the data bus in accordance with the present invention.

FIG. 4 shows a flow diagram for the execution of a write transaction in accordance with the present invention. FIG. 8 shows a flow diagram for the execution of a read response in accordance with the present invention. Illustratively, both the write protocol of FIG. 4 and read response protocol of FIG. 8 are carried out by finite-state machines located at the individual processors. As indicated above, these protocols make use of the signals DS*, RspReqD*, and WReqD*.

The operation of the write protocol is now considered in connection with FIG. 4. If a write transaction wants the data bus (step 100), the transaction must first join the command bus arbitration and win (step 102). Then, the signals DS* and RspReqD* are sampled (step 104). There are four cases:

DS* and RspReqD* both dis-asserted (106)
DS* dis-asserted but RspReqD* asserted (108)
DS* asserted bus RspReqD* dis-asserted (110)
DS* and RspReqD* both asserted (112)

(As used in FIG. 4, non-active has the same meaning as dis-asserted, and active has the same meaning as asserted).

Figure 5:
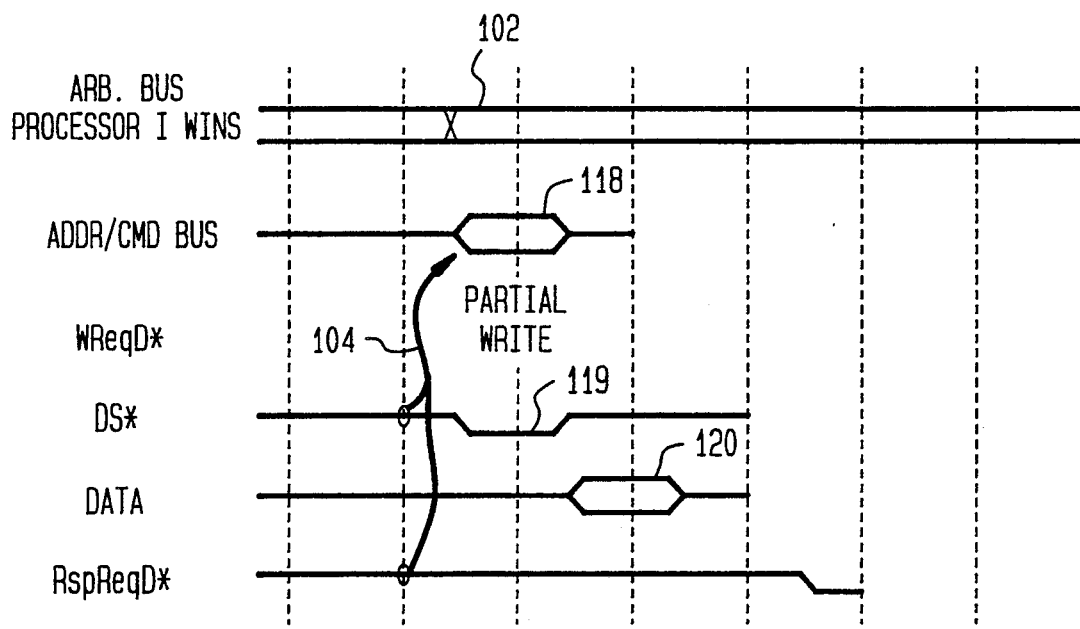
FIGS. 5, 6, and 7 illustrate the timing of various signals in the protocol of FIG. 4.

The timing of the signals for case 106 is illustrated in FIG. 5 in connection with FIG. 4. Illustratively, the processor i wins the command bus arbitration (102) so that processor i seizes the address/command bus. The signals DS* and RspReqD* are sampled (104) and both are dis-asserted indicating that the data bus is currently available and no read response is waiting for the data bus. Thus, the write command is issued on the command bus and the command bus is released (118). The signal DS* is then asserted (119) indicating there is valid data for the data bus for the next cycle and the write data is transmitted on the data bus (120).

The timing of signals for the cases 108 and 110 is now considered. In both of these cases, the write transaction is the next user of the data bus. In case 110, DS* is asserted meaning the data bus is currently in use, but RspReqD* is not asserted, meaning there is no read response waiting for the data bus. Thus, the write transaction goes next on the data bus. In case 108, DS* is not asserted, meaning that the data bus is not currently in use, but RspReqD* is asserted, meaning that a read response is waiting for the data bus. This read response goes first on the data bus but the write transaction immediately follows. Thus, in both of these cases, the data bus is available for the waiting write data when DS* makes a transition from the asserted state to the dis-asserted state, as this indicates that the one prior transaction is completed. This transition is indicated by 122, 123 in FIG. 4.

Figure 6:
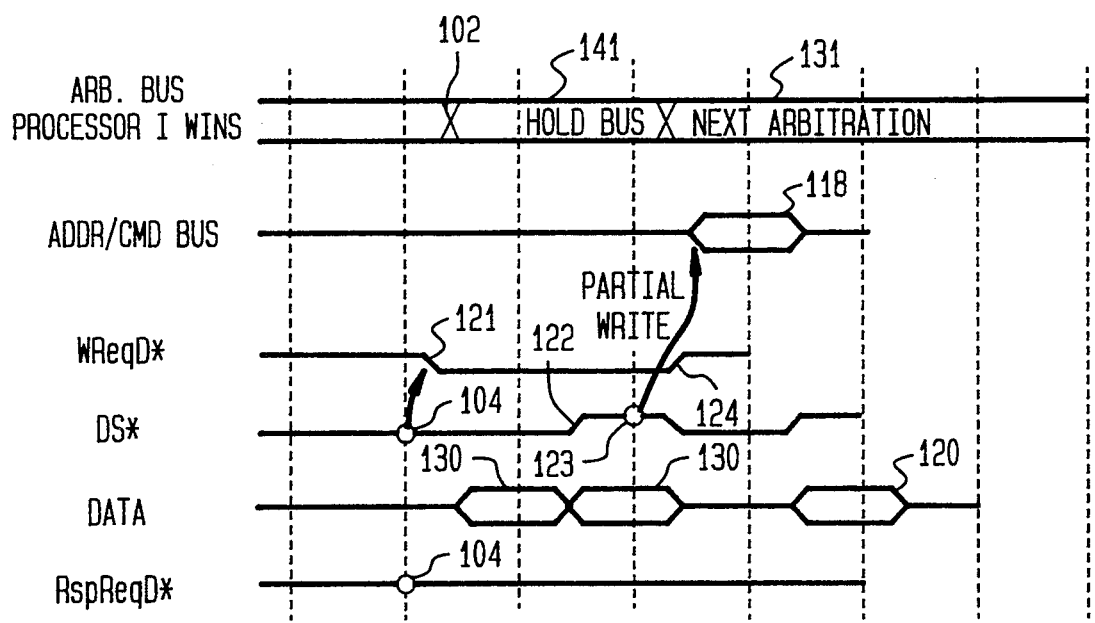

The timing of the signals for the case 110 is illustrated in FIG. 6 in connection with FIG. 4. Illustratively, the processor i wins the command bus arbitration (102) and seizes the command bus. The signals DS* and RspReqD* are sampled (104) and DS* is found to be asserted which means the data bus is busy as indicated by the data 130. Thus, the command bus is held and the signal WReqD* is asserted (121). Because the command bus is held, there are no further command bus arbitrations as indicated at 141. The signal DS* is dis-asserted at 122. This means that there is no valid data for the data bus for the next clock cycle and the data bus is available. The dis-asserting of DS* is detected by the processor i when it samples DS* at 123. Thus, the processor i has detected the transition in DS* from the asserted to the dis-asserted stage, indicating that the data bus is ready for the waiting write data. Thus, the signal WReqD* is dis-asserted (124), the write command is issued on the command bus and the command bus is released (118). The write data is then transferred on the data bus (120). When the command bus is released, the next command bus arbitration (131) is performed.

The timing of the signals for the case 112 is now considered. In this case, the write transaction is the second next user of the data bus. More particularly, in this case both DS* and RspReqD* are asserted. This means that one transaction is currently using the data bus and a read response is waiting for the data bus. This read response is the next transaction on the data bus. The write transaction is the second next user of the data bus, i.e., it immediately follows the read response. Thus, the data bus is available for the waiting write data after DS* makes two transitions from the asserted state to the dis-asserted state. A first transition of DS* from the asserted state to the dis-asserted state takes place when the current transaction is completed (step 143 of FIG. 4). Then DS* is asserted for the read response (step 145 of FIG. 4). After the read response is complete, DS* makes a second transition from the asserted to the dis-asserted state (122, 123 of FIG. 4). This means the data bus is ready for the waiting write data.

Figure 7:
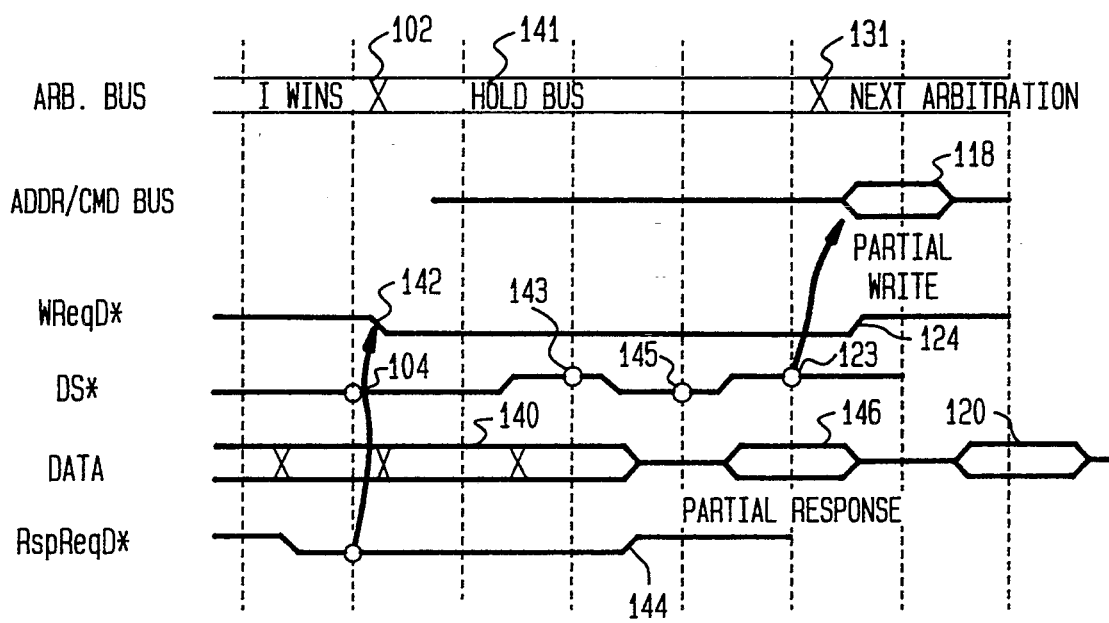

The timing of the signals for this case is shown in greater detail in FIG. 7 in connection with FIG. 4. Illustratively, the processor i wins the command bus arbitration (102) and seizes the command bus. The signals DS* and RspReqD* are sampled (104) and both are found to be asserted. This means the data bus is busy as indicated by the data 140 and also that a read response is waiting for, but has not yet accessed, the data bus. Thus, the processor i holds the command bus, and no further command bus arbitration takes place (141). The signal WreqD* is asserted (142). DS* is sampled again and is found to be dis-asserted (143) because the transfer of the data 140 is complete. Now, the waiting read response gains access to the data bus. This is indicated by the dis-assertion of RspReqD* at 144, and the assertion of DS* at 145, indicating there is valid data for the data bus on the next cycle. This valid data is the read response data 146. At 123 DS* is again sampled and found to be dis-asserted indicating the data bus is free. Thus, the signal DS* has now made two transitions from the asserted to the dis-asserted state so that now it is the turn of the write transaction to use the data bus. The signal WReqD* is dis-asserted (124). The write command 118 is issued on the command bus and the command bus is released so the next command bus arbitration 131 can take place. The write data 120 is issued on the data bus.

The operation of the response protocol is now considered in connection with FIG. 8. If a read response wants access to the data bus (step 200), the response must be at the head of a first-request-first-response queue of read responses (step 202). This means that the previous response in the queue has begun or has completed its data transfer. The processor desiring to perform the read response then asserts RspReqD* (step 204) and samples DS* and WReqD* (step 206).

There are four cases:

DS* and WReqD* are both dis-asserted (case 208)

DS* is dis-asserted and WReqD* is asserted (case 210)

DS* is asserted and WReqD* is dis-asserted (case 212)

DS* and WReqD* are both asserted (case 214)

Figure 9:
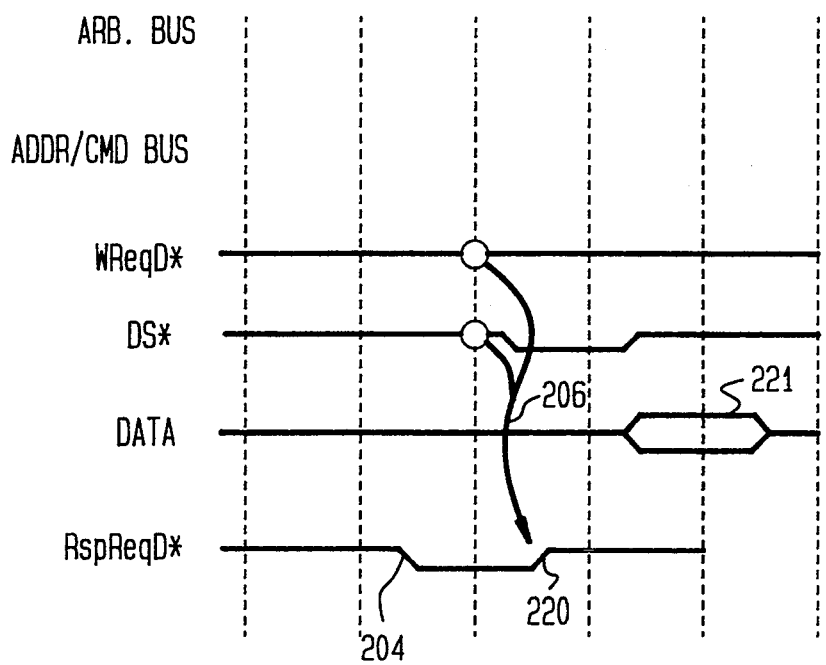
FIGS. 9, 10 and 11 illustrate the timing of various signals in the protocol of FIG. 8.

The timing of the signals for the case 208 is illustrated in FIG. 9 in connection with FIG. 8. The signal RspReqD* is asserted (204). The signal WReqD* and DS* are sampled (206) and found to be dis-asserted. This means that the data bus is not occupied and there is no write request waiting for the data bus. The signal RspReqD* is dis-asserted (220), and the response data is issued on the data bus (221).

The timing of the signals for the cases 210 and 212 is now considered. In both of these cases, the read response is the next user of the data base. In the case 212, DS* is asserted meaning that there is a transaction currently on the data bus, but WReqD* is not asserted, meaning there is no write data waiting for the data bus. Thus, after the current transaction is completed, the read response goes next on the data bus. In case 210, DS* is not asserted meaning that the data bus is not currently in use, but WReqD* is asserted, meaning that write data is waiting for the data bus. This write data goes first on the data bus but the read response data immediately follows. In both of the cases 210, 212 the data bus is available for the waiting read response when DS, makes a transition from the asserted state to the dis-asserted state, which indicates that the one prior transaction is complete. This transition is indicated at 231 in FIG. 8.

Figure 10:
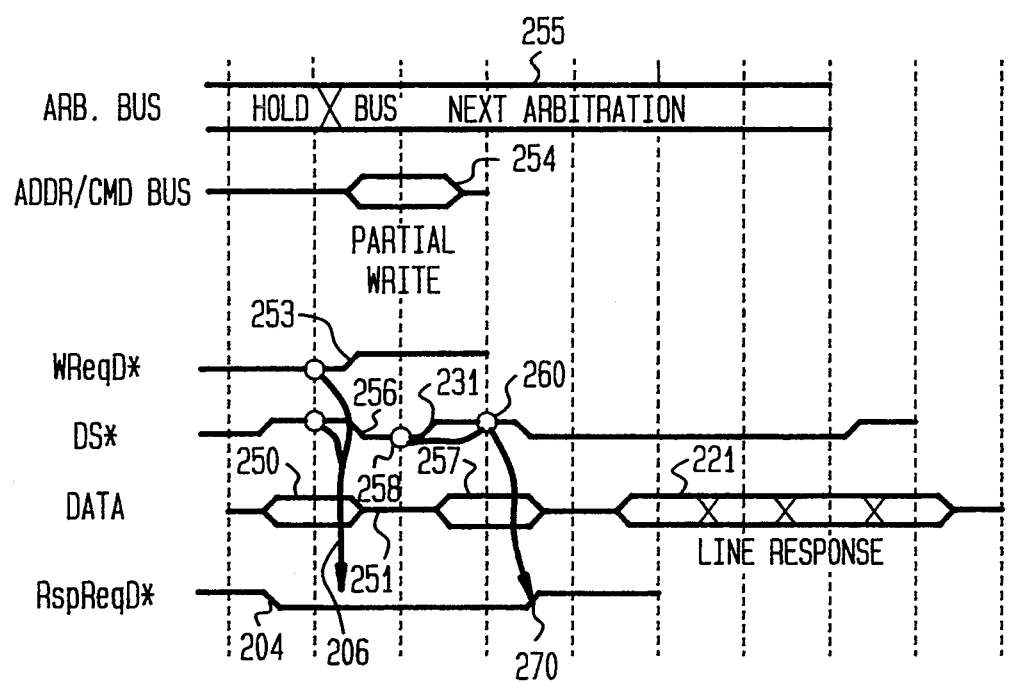

The timing of the signals for the case 210 is illustrated in FIG. 10 in connection with FIG. 8. In FIG. 10, a processor i with a response at the head of the read response queue asserts RspReqD* (204) and samples DS* and WReqD* (206). The signal WReqD* is asserted and DS* is dis-asserted. As indicated above, this means that there is no valid data for the data bus in the next clock cycle, i.e., after the data 250 the data bus is unoccupied for the next clock cycle 251. It is now the turn of the waiting write data to gain access to the data bus. Thus, the signal WReqD* is dis-asserted (253). The write command is issued on the command bus (254), and the command bus is released. (Recall, a write command holds the command bus, until the write data is able to access the data bus). A next command bus arbitration is now able to take place (255). In addition, the signal DS* is asserted (256) indicating that valid data (in this case the write data 257) will be on the data bus for the next cycle. The signal DS* is sampled by the processor i at 258. Thus, the processor knows that DS* is now asserted. Because the write data is only one cycle, the signal DS* is dis-asserted at 231 (see FIG. 8), indicating that the data bus will be free in the next cycle. The signal DS* is again sampled by the processor i at 260. Thus, the processor i detects that DS* has made a transition from the asserted state to the dis-asserted state (step 231 of FIG. 8). The data bus is now ready for the read response. Thus, RspReqD* is dis-asserted (220) and the read response data is transmitted on the data bus (221).

referring to case 214 of FIG. 8, the read response is the second next use of the data bus. In this case both DS* and WReqD* are asserted. This means that one transaction is currently using the data bus and write data is waiting for, but has not yet gained access to, the data bus. This write data is the next transaction on the data bus. The read response follows the write data on the data bus. Thus, the data bus is available for the waiting read response after DS* makes two transitions from the asserted state to the dis-asserted state. A first transition of DS* from the asserted state to the dis-asserted state takes place when the current transaction is completed (step 263 of FIG. 8). Then DS* is asserted for the write data (step 265). After the write data is transferred, DS* makes a second transition from the asserted to the dis-asserted state (231). This means that the data bus is ready for the read response.

Figure 11:
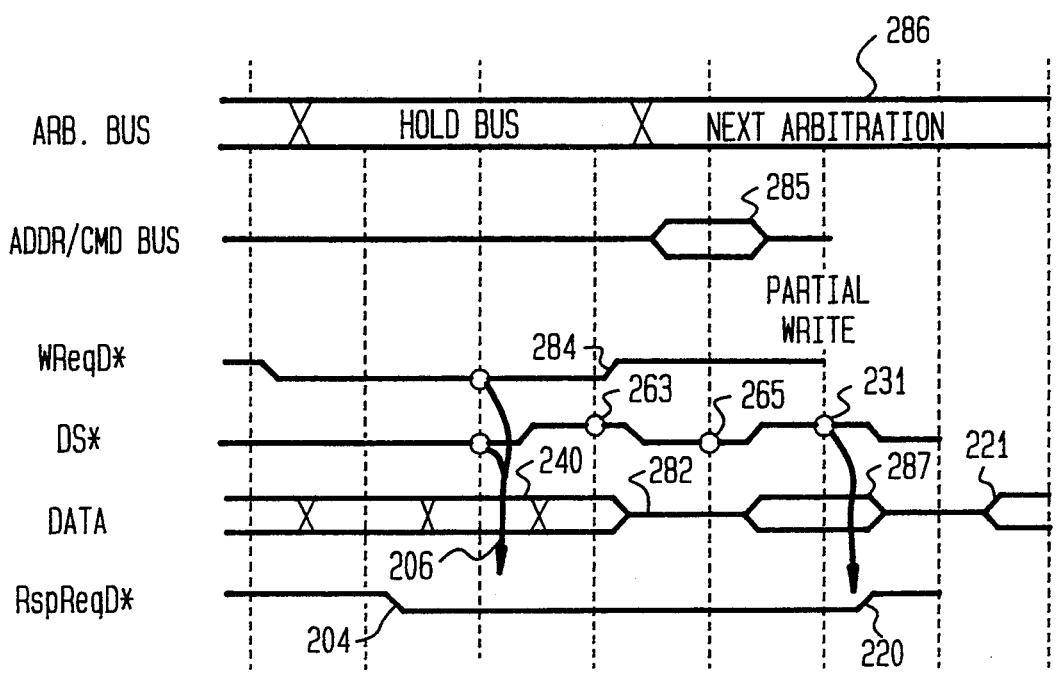

The timing of the signal for this case is illustrated in FIG 11 in connection with FIG. 8. A processor i with a read response asserts RspReqD* (204) and samples DS* and WReqD* (206). Both DS, and WReqD* are asserted. The transaction currently on the data bus is represented by the data 280. The processor i detects that DS, is dis-asserted at 263 as the data 280 is complete and there is no valid data for the data bus for the cycle 282. Now the waiting write data gains access to the data bus. The signal WReqD* is dis-asserted at 284, the write command 285 is issued on the command bus, the command bus is released, and the next command bus arbitration goes forward at 286. The processor i detects the signal DS* as asserted at 265 as the write data is issued on the data bus at 287. The write data has a duration of only one cycle so that the processor i detects DS* as being dis-asserted at 231. The signal DS* has now made two transitions from the asserted to the dis-asserted state so that now it is the turn of the read response to gain access to the data bus. Thus RspReqD* is dis-asserted at 220 and the read response data is issued on the data bus at 221.

In short, a protocol has been disclosed which insures both split read responses and write data have fair access to a data bus in a computer system comprising a plurality of processors and demultiplexed data and command buses. Finally, the above-described embodiments of the invention are intended to be illustrative only. Numerous alternative embodiments may be devised by those skilled in the art without departing from the spirit and scope of the following claims.

I claim:

1. A method for arbitrating read and write transactions in a computer system comprising a command bus, a data bus, and a plurality of processors in communication with said command and data buses, comprising the steps of:
 a) said processor performing red command steps to issue a read command, said read command steps comprising:
  1) taking control of the command bus; and
  2) issuing the read command on the command bus;
 b) said processor performing write transaction steps to perform a write transaction, said write transaction steps comprising
  1) taking control of the command bus;
  1) sampling a first signal which when in an active state indicates that the data bus is occupied and a second signal which when in an active state indicates that a response to a read command is waiting for access to the data bus;
  3) if both the first and second signals are not in active steps, issuing a write command on the command bus, then releasing the command bus to go on to a next command bus arbitration, and issuing write data on the data bus;
  4) if one of the first and second signals is in the active state and the other is not, holding the command bus and activating a third signal which indicates that write data is waiting for access to the data bus, and after the first signal makes a transition from the active state to a nonactive state de-activating the third signal, issuing the write command on the command bus, releasing the command us to go on to a next command bus arbitration, and issuing the write data on the data bus;
  5) if both the first and second signals are in active states, holding the command bus, activating said third signal, and, after the first signal makes two transitions form the active to the non-active state, deactivating said third signal, issuing the write command on the command bus, releasing the command bus to go on to a next command bus arbitration, and issuing the write data on the data bus; and
 c) said processor performing response steps to provide an ordered split response to a read command wherein said response is first in a first-request-first-response queue of ordered split read responses, said response steps comprising,
  1) activating said second signal;
  2) sampling said first and third signals;
  3) if both the first and third signals are in non-active states, deactivating the second signal and issuing response data on the data bus,
  4) if one of the first and third signals, but not both is in an active state, waiting until the first signal makes a transition from the active to the non-active state, then deactivating said second signal and issuing the response data on the data bus, and 5) if both the first and third signals are in the active state, waiting until the first signal makes two transitions from the active state to the non-active state, and then deactivating said second signal and issuing data on the data bus.

2. The method of claim 1, further comprising the processor issuing a read command or performing a write transaction by taking control of the command bus by winning an arbitration.

3. The method of claim 2, further comprising performing said arbitration in a distributed manner.

4. An arbitration method for insuring that write data associated with write commands and response data associated with read commands achieve fair access to a bus, in a computer system comprising demultiplexed command and data buses and a plurality of processors, said method comprising the steps of:

activating a write request signal indicating that a processor has write data waiting for said data bus, said write request signal insuring that no more than a current transaction on the data bus and one waiting read response use the data bus before the waiting write data, and activating a read response request signal indicating that a processor has a read response waiting for said data bus, which read response is first in a first-request-first-response queue of read responses, said read response request signal insuring that no more than a current transaction on the data bus and the waiting write data of one write command use the data bus before the waiting read response.

* * * * *